United States Patent Office 2,905,698
Patented Sept. 22, 1959

2,905,698

PRODUCTION OF DELTA-EPSILON-UNSATURATED CARBOXYLIC ACIDS, THEIR DERIVATIVES AND THE CORRESPONDING DELTA-VALEROLACTONES

Wilhelm Friedrichsen, Ludwigshafen (Rhine), Germany, assignor to Badische Anilin- & Soda-Fabrik Aktiengesellschaft, Ludwigshafen (Rhine), Germany No Drawing. Application April 23, 1956
Serial No. 579,728

Claims priority, application Germany April 27, 1955

7 Claims. (Cl. 260—343.5)

This invention relates to a process for the production of delta-epsilon-unsaturated carboxylic acids, their derivatives and the corresponding delta-valerolactones.

We have found that delta-epsilon-unsaturated carboxylic acids or their derivatives are obtained in a technically advantageous manner by reacting an olefine which bears a $CH_3$— or $CH_2$— group adjacent to the double linkage, at a temperature above 150° C., with a compound of the general formula X—$CH_2$—$CH_2$—Y in which X represents a halogen atom or a hydroxy, alkoxy, aryloxy or acyloxy group, Y a carboxylic, ester, carbonamide or nitrile group and X and Y together may form a group —O—CO—.

Suitable compounds of this general formula are for example beta halogenpropionic acids, hydracrylic acid, beta-alkoxy- and beta- acyloxy-propionic acids and their esters and amides, beta-propiolactone and the nitriles of beta-halogen-, beta-hydroxy-, beta-alkoxy- or beta acyloxy-propionic acids.

Suitable olefines are in particular propylene and isobutylene.

When using propylene and beta-methoxypropionic acid methyl ester, the reaction may be formulated as follows:

$H_2C=CH—CH_3+CH_3O—CH_2—CH_2—COOCH_3 \rightarrow$
$H_2C=CH—CH_2—CH_2—CH_2—COOCH_3+CH_3OH$ When using free acids, as for example hydracrylic acid, lactones may be formed in addition to the delta-epsilon-unsaturated carboxylic acids, for example:

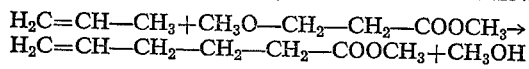

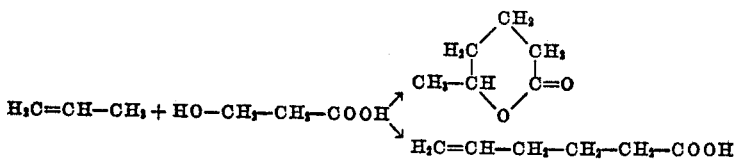

The reaction is preferably carried out in the presence of a solvent or diluent, such as hydrocarbons, organic acids, esters, ketones, ethers, alcohols and/or water. To avoid polymerizations, the usual stabilizers, such as hydroquinone, pyrogallol or aminophenols, in amounts of about 0.01 up to about 5 percent of the reaction mixture are added. It is also advantageous to work in corrosion-proof vessels. The most favorable temperatures lie at about 200° to 350° C.

The products obtainable according to the process of this invention are valuable intermediate products, in particular for softeners, plastics, textile assistants and pharmaceutical products.

The following examples will further illustrate this invention but the invention is not restricted to these examples. The parts specified in the examples are parts by weight.

*Example 1*

225 parts of hydracrylic acid are heated for about 30 minutes at about 320° C. in a silver-lined autoclave with 400 parts of isobutylene with the addition of 400 parts of propionic acid and 1 part of pyrogallol. After distilling off unchanged initial material, 48 parts of 2-methylhexene-(1)-acid-(6) and 40 parts of 4.4-dimethyl-delta-valerolactone formed from the said acid by lactonization. The mixture boils at 115° to 130° C. at a pressure of 20 torr. The mixture may readily be separated by extraction with aqueous caustic alkali solution. The pure 2-methylhexene-(1)-acid-(6) recovered by acidifying the alkaline extract boils at atmospheric pressure at 223° to 225° C. and 4.4-dimethyl-delta-valerolactone at 225° to 230° C.

*Example 2*

320 parts of beta-propionyloxy-propionic acid are heated with 400 parts of propylene with the addition of 160 parts of propionic acid and 1 part of pyrogallol in a silver-lined autoclave for about 30 minutes at about 310° C. By fractional distillation of the reaction mixture there are obtained, besides unchanged initial materials, 45 parts of hexene-(1)-acid-(6) boiling at 202° to 205° C. and 34 parts of a residue of higher boiling point consisting of 4-methyl-delta-valerolactone and polymeric compounds. Similar yields of hexene(1)-acid-(6) are obtained by using, instead of beta-propionyloxy-propionic acid, the equivalent amounts of beta-acetoxy-, beta-ethoxy or beta-propoxy propionic acid or hydracrylic acid.

*Example 3*

16 parts of beta-methoxypropionic acid methyl ester are heated for about an hour at about 320° C. with 20 parts of isobutylene with an addition of 20 parts of propionic acid and 0.1 part of pyrogallol in a silver autoclave. After distilling off the first runnings, the residue containing the 2-methylhexene-(1)-acid-(6)-methylester and the 4.4-dimethyl-delta-valerolactone formed is heated with 10 parts of 20% caustic soda solution. The alkaline solution, after cooling, is acidified with dilute sulfuric acid and the resultant upper layer is extracted with ether. By fractional distillation there are obtained therefrom 8 parts of 2-methylhexene-(1)-acid-(6) boiling at 110° to 120° C. at a pressure of 20 torr. If, instead of beta-methoxy propionic acid methylester, the equivalent amount of beta-methoxy propionitrile is used, there is obtained a reaction mixture containing 2-methyl 5-cyano-pentene-(1) which by saponifying yields about 7 parts of 2-methyl-hexene-(1)-acid-(6).

*Example 4*

273 parts of beta-chlorpropionic acid are heated with 360 parts of propylene, 110 parts of water, 360 parts of propionic acid and 1 part of pyrogallol in a silver-lined autocalve for about 1 hour at about 320° C. By fractional distillation of the reaction product there are obtained 35 parts of hexene-(1)-acid-(6) boiling at 200° to 205° C. and 40 parts of 4-methyl-delta-valerolactone boiling at 210° to 215° C.

*Example 5*

144 parts of beta propiolactone are heated in a silver-lined autoclave with 350 parts of propylene with the addition of 288 parts of propionic acid and 1 part of hydroquinone for about 30 minutes at about 320° C. From the reaction mixture, by fractional distillation, there are obtained 70 parts of hexene-(1)-acid-(6) boiling at 105° to 110° C. at a pressure of 25 torr and 55 parts of a higher boiling residue containing 4-methyl-delta-valerolactone and polymeric compounds.

I claim:

1. An improved process for the production of delta-epsilon-unsaturated carboxylic acids, their esters, nitriles and the corresponding delta-valerolactones which comprises heating a member of the class consisting of beta-chlor, beta-hydroxy, beta-lower-alkoxy and beta-lower-alkyl-carbo-oxy propionic acids, their lower alkyl esters, and nitriles and beta-propiolactone with an olefine selected from the class consisting of propylene and isobutylene at temperatures above 150° up to about 350° C. in the presence of a stabilizer selected from the class consisting of hydroquinone, pyrogallol and aminophenol.

2. An improved process for the production of a mixture of hexene-(1)-acid-(6) and 4-methyl-delta-valerolactone which comprises heating a mixture of propylene, propionic acid and beta-propionyloxy-propionic acid in the presence of a stabilizer selected from the class consisting of hydroquinone, pyrogallol and aminophenol for about 30 minutes at about 310° C.

3. An improved process for the production of a mixture of hexene-(1)-acid-(6) and 4-methyl-delta-valerolactone which comprises heating a mixture of propylene, propionic acid and beta-chlorpropionic acid in the presence of a stabilizer selected from the class consisting of hydroquinone, pyrogallol and aminophenol for about 1 hour at about 320° C.

4. An improved process for the production of a mixture of hexene-(1)-acid-(6) and 4-methyl-delta-valerolactone which comprises heating a mixture of propylene, propionic acid and beta-propiolactone in the presence of a stabilizer selected from the class consisting of hydroquinone, pyrogallol and aminophenol for about 30 minutes at about 320° C.

5. An improved process for the production of a mixture of 2-methylhexene-(1)-acid-(6) and 4.4-dimethyl-delta-valerolactone which comprises heating a mixture of hydracrylic acid, isobutylene and propionic acid in the presence of a stabilizer selected from the class consisting of hydroquinone, pyrogallol and aminophenol for about 30 minutes at about 320° C.

6. An improved process for the production of delta-epsilon-unsaturated carboxylic acids, their esters, nitriles and the corresponding delta-valerolactones which comprises heating a member of the class consisting of beta-chlor, beta-hydroxy, beta-lower-alkoxy and beta-lower-alkyl-carbo-oxy propionic acids, their lower alkyl esters and nitriles and beta-propiolactone with an olefine selected from the class consisting of propylene and isobutylene at temperatures above 150° up to about 350° C. in the presence of propionic acid and a stabilizer selected from the class consisting of hydroquinone, pyrogallol and aminophenol.

7. An improved process for the production of 2-methylhexene-(1) acid-(6) which comprises heating a mixture of beta-methoxy-propionic acid methyl ester, isobutylene and propionic acid in the presence of a stabilizer selected from the class consisting of hydroquinone, pyrogallol and aminophenol at about 320° C., saponifying the reaction product containing the 2-methylhexene-(1)-acid-(6)-methyl ester and the 4,4-dimethyl-delta-valero-lactone formed by boiling it with at least the equivalent amount of about a 20 percent by weight caustic soda solution and acidifying the solution obtained.

References Cited in the file of this patent

UNITED STATES PATENTS 2,569,064   Ladd et al. _____ Sept. 25, 1951